United States Patent

Annaka

(10) Patent No.: US 9,070,073 B2
(45) Date of Patent: Jun. 30, 2015

(54) IMAGE FORMING APPARATUS AND METHOD OF PAGE CLASSIFICATION THEREIN

(71) Applicant: CANON KABUSHIKI KAISHA, Tokyo (JP)

(72) Inventor: Takashi Annaka, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/469,504

(22) Filed: Aug. 26, 2014

(65) Prior Publication Data

US 2015/0062597 A1 Mar. 5, 2015

(30) Foreign Application Priority Data

Sep. 4, 2013 (JP) ................. 2013-183406

(51) Int. Cl.
| | |
|---|---|
| *G06F 15/00* | (2006.01) |
| *G06K 1/00* | (2006.01) |
| *H04N 1/00* | (2006.01) |
| *G06K 15/02* | (2006.01) |
| *G06K 15/00* | (2006.01) |
| *G06F 3/12* | (2006.01) |

(52) U.S. Cl.
CPC .......... *G06K 15/1823* (2013.01); *G06K 15/407* (2013.01); *G06F 3/1219* (2013.01); *G06F 3/1242* (2013.01); *G06F 3/1258* (2013.01)

(58) Field of Classification Search
CPC ............. G06K 15/1823; G06K 15/407; G06F 3/1219; G06F 3/1242; G06F 3/1258
USPC ..................... 358/1.1, 1.6, 1.2, 1.9
See application file for complete search history.

(56) References Cited

U.S. PATENT DOCUMENTS

| 8,751,411 B2 | 6/2014 | Nagarajan et al. |
| 8,810,848 B2 * | 8/2014 | Nakajima et al. ............ 358/1.18 |
| 2004/0034685 A1 * | 2/2004 | Suzuki et al. ................. 709/203 |

FOREIGN PATENT DOCUMENTS

JP 2010-89486 A 4/2010

* cited by examiner

*Primary Examiner* — Douglas Tran
(74) *Attorney, Agent, or Firm* — Fitzpatrick, Cella, Harper & Scinto

(57) ABSTRACT

In a case of performing free size printing with a charging approach in which a charge classification is determined based on a color pixel utilization rate, the color pixel utilization rate calculating is performed using a total number of pixels in an image area cut out at a size for color pixel utilization rate calculation, rather than the generation image data on the whole, for a denominator. With this, the calculation result of the color pixel utilization rate is prevented from becoming inaccurate.

11 Claims, 11 Drawing Sheets

| CHARGE CLASSIFICATION | SHEET SIZE ※ | UNIT PRICE | NUMBER OF SHEETS | CHARGE AMOUNT |
|---|---|---|---|---|
| MONOCHROME | Small | 5 | 1135 | 5675 |
| MONOCHROME | Large | 10 | 321 | 3210 |
| LOW AREA COLOR | Small | 10 | 530 | 5300 |
| LOW AREA COLOR | Large | 20 | 211 | 4220 |
| FULL COLOR | Small | 15 | 630 | 9450 |
| FULL COLOR | Large | 30 | 457 | 13710 |
| FULL AREA COLOR | Small | 20 | 126 | 2520 |
| FULL AREA COLOR | Large | 40 | 98 | 3920 |

※ Small ... A4, LTR, B5, B4, etc    Large ... A3, 11×17, etc

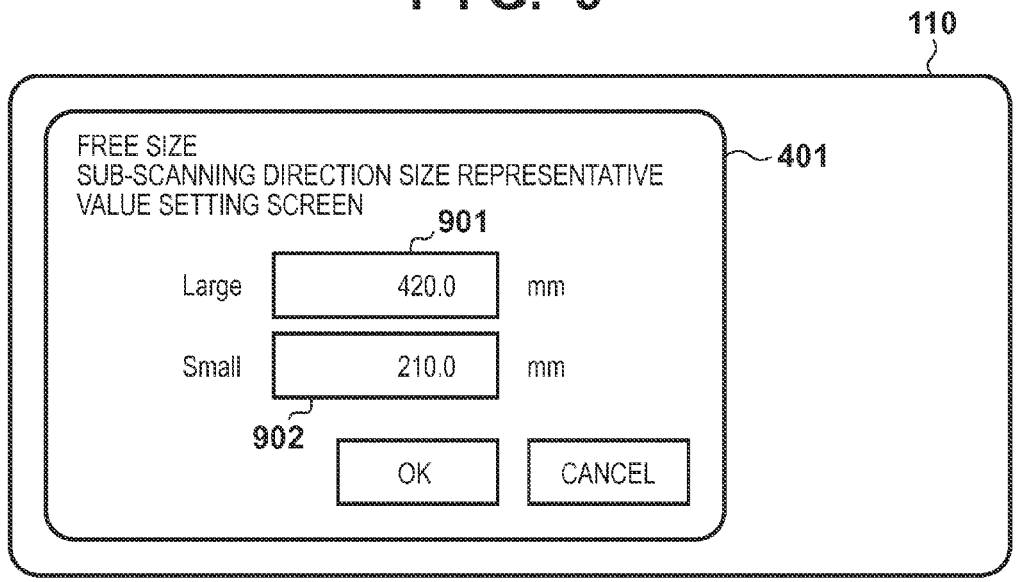
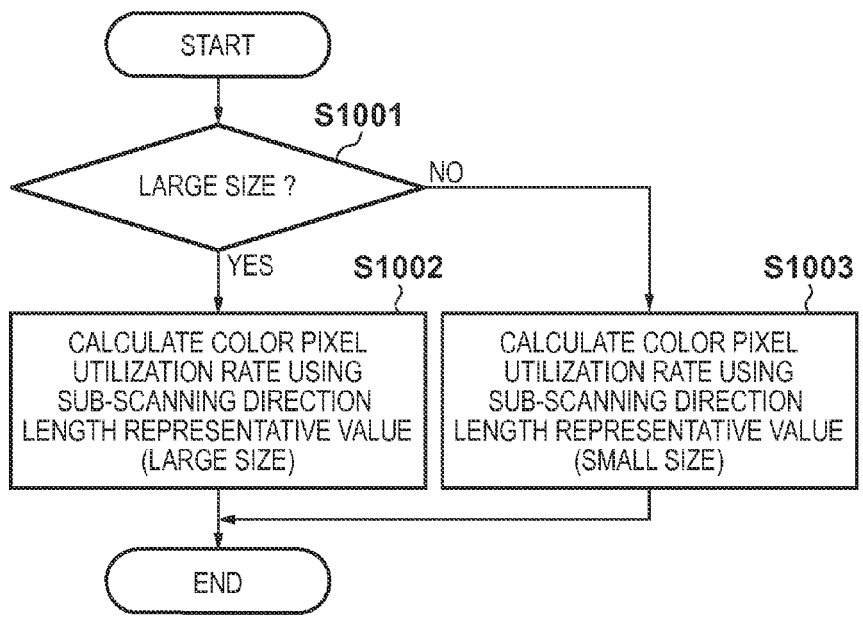

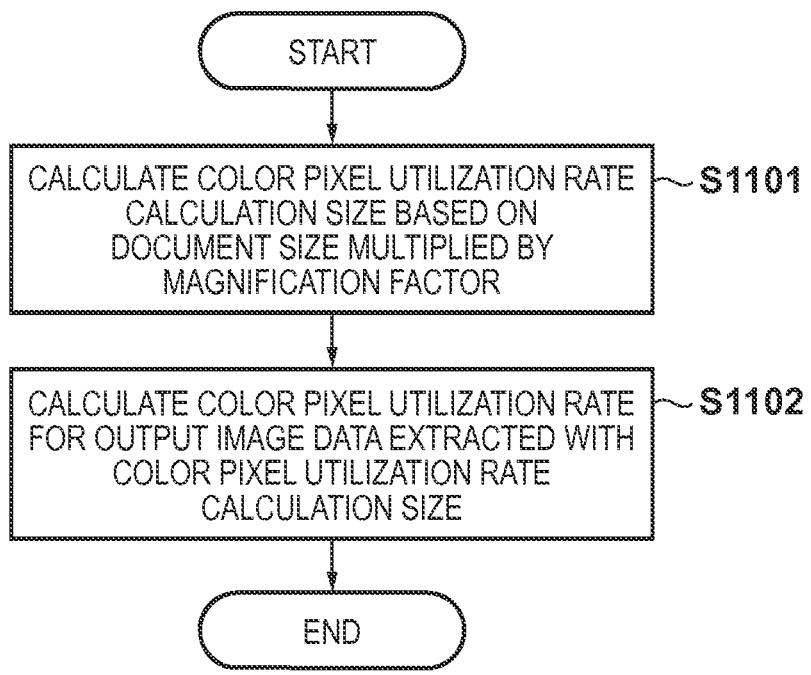

F I G. 12A
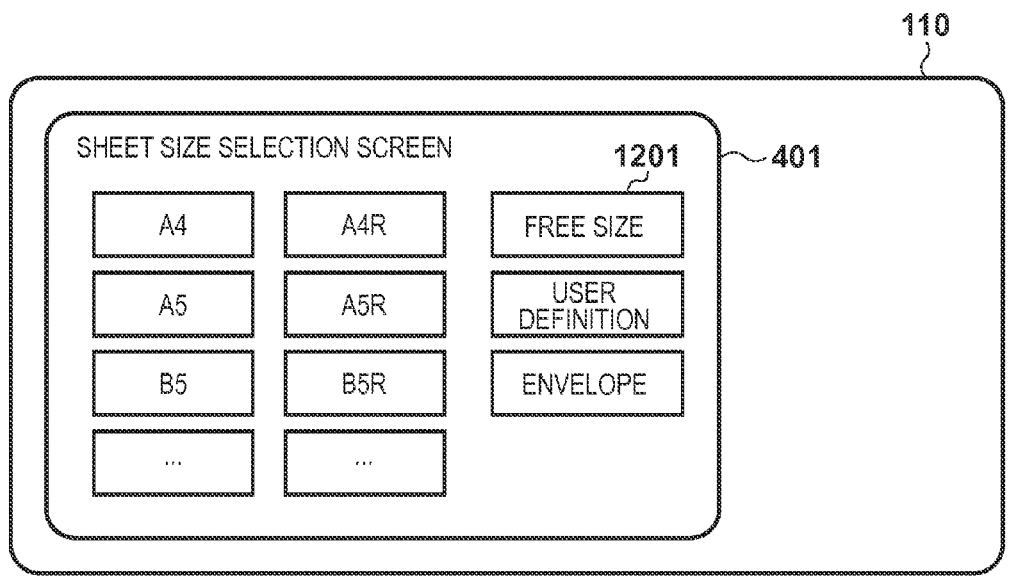
F I G. 12B
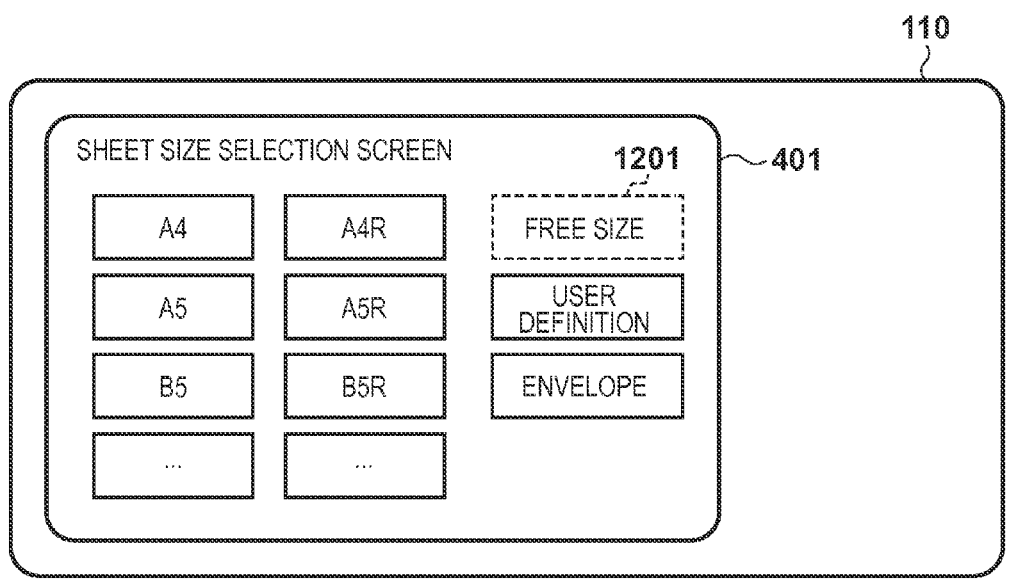

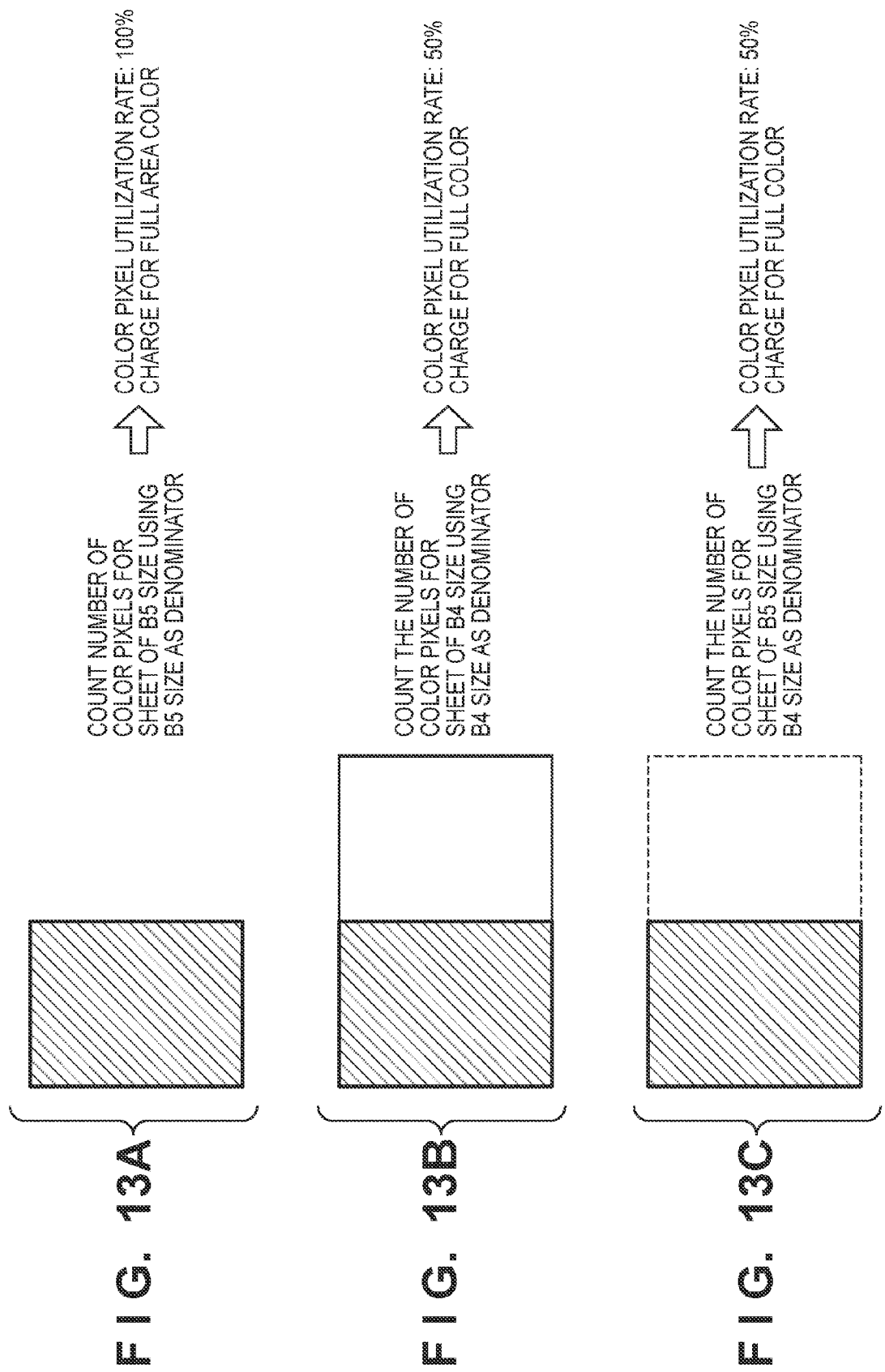

IMAGE FORMING APPARATUS AND METHOD OF PAGE CLASSIFICATION THEREIN

BACKGROUND OF THE INVENTION

1. Field of the Invention

The present invention relates to, for example, an image forming apparatus that charges in accordance with an amount of printing, and to a page classification method for charging in an image forming apparatus.

2. Description of the Related Art

Conventionally, as a charging approach in an image forming apparatus, charging is performed according whether the printing is color printing or monochrome printing. However, toner amount consumed based on the number of color pixels in images is different when performing different color printing. For this reason, uniform charging for color printing at a single classification may be undesirable from the viewpoint of both a service provision side and a user side. So, a technique recited in Japanese Patent Laid-Open No. 2010-89486, which counts the number of color pixels that satisfy fixed conditions for each page and which switches a charge classification based on the number of color pixels or a color pixel utilization rate, is proposed.

However, in the technique recited in Japanese Patent Laid-Open No. 2010-89486, a case where a size of the sheet that is printed is unknown is not considered. For example, in a case a free size printing, in which the size of the sheet is not specified explicitly, there are issues in that the number of color pixels recorded on a sheet is also unknown, and a calculation of a color pixel utilization rate is not performed correctly.

For example, in a case of printing when setting an A4 size sheet in an image forming apparatus, the image forming apparatus can generate output image data to match the A4 size which is the output sheet size. For this reason, a calculation of the number of color pixels or the color pixel utilization rate can be performed based on an actual region printed on a paper.

However, in a case of a free size printing, the sheet size is unknown at the time of generating output image data. Even though a main scanning direction length is detectable by a guide of a paper feeding unit, there is no way to know an actual sheet size for an image forming apparatus side, because there is no size detection means for a sub-scanning direction length and a size input by a user is not performed. For this reason, in a case of a free size printing, neither the number of color pixels nor a color pixel rate based on a sheet size can be calculated, and so a charge classification based on these values cannot be adopted.

SUMMARY OF THE INVENTION

The present invention is made in view of the conventional example described above, and determines a classification for charging even if a sheet size is unknown.

The present invention comprises the following configuration. According to one aspect of the present invention, there is provided an image forming apparatus comprising: a determination unit configured to determine whether an output sheet size is in a first category or in a second category having a size larger than that of the first category; a unit configured to obtain a color surface area in a printing target page; and a deciding unit configured to decide a charge classification of the page from among a monochrome charge classification and a plurality of color charge classification based on the determined category and the obtained color surface area, wherein the determining unit, in a case where the output sheet size is unknown, is configured to determine that the output sheet size is in the second category.

According to the present invention, even in a case, such as with free size printing, where a sheet size is unknown, an appropriate classification can be determined, then an appropriate charge amount can be determined.

Further features of the present invention will become apparent from the following description of exemplary embodiments with reference to the attached drawings.

BRIEF DESCRIPTION OF THE DRAWINGS

FIG. 9 is a view for showing an example of the sub-scanning length setting screen for free size printing according to the second embodiment.

FIG. 10 is a color pixel utilization rate calculation processing flowchart for free size printing according to the second embodiment.

FIG. 11 is a color pixel utilization rate calculation processing flowchart for free size printing according to a third embodiment.

FIG. 12A and FIG. 12B are views for showing examples of an operation unit display switching according to a fourth embodiment.

FIG. 13A, FIG. 13B and FIG. 13C are views for showing examples of a problem and a solution according to a fifth embodiment.

DESCRIPTION OF THE EMBODIMENTS

Hereinafter, embodiments for working the present invention are explained using drawings.

First Embodiment

<Configuration of Image Forming Apparatus>

Figure 1:
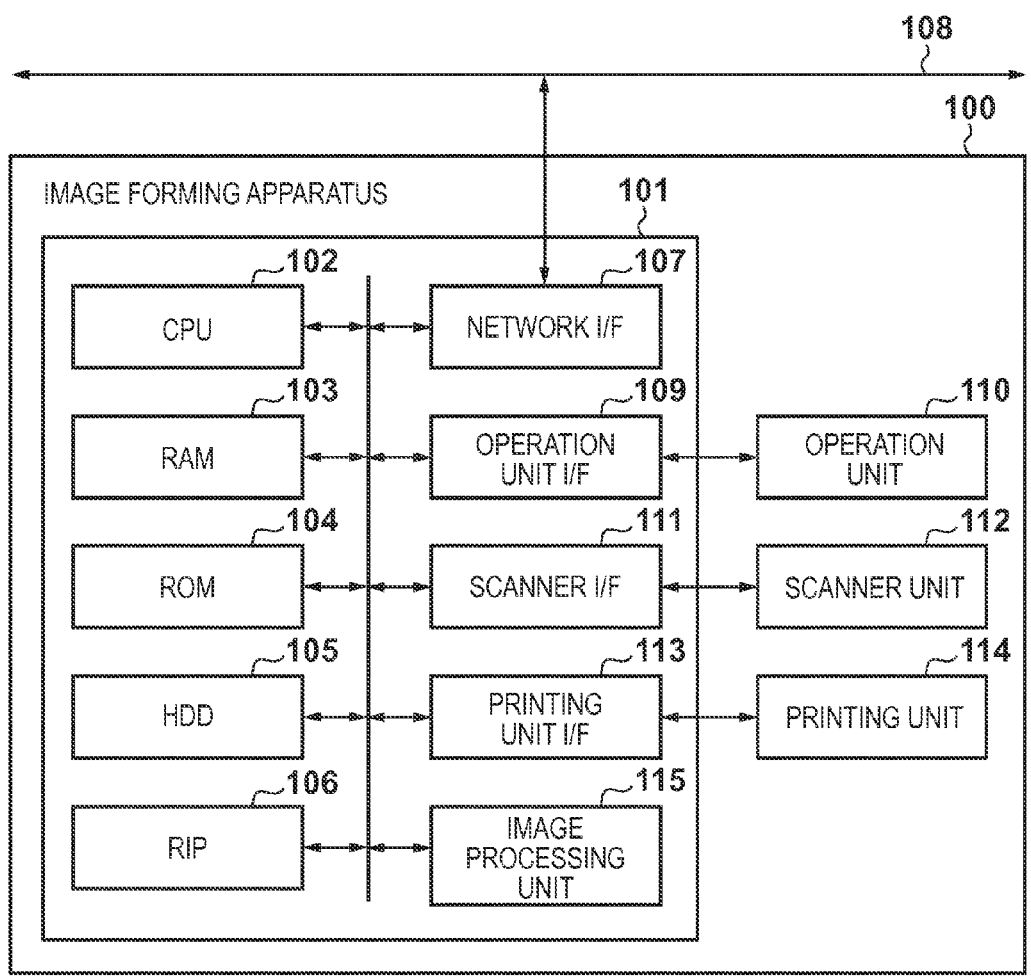
FIG. 1 is a hardware configuration diagram of an image forming apparatus according to a first embodiment.

FIG. 1 is a hardware configuration diagram of an image forming apparatus 100 according to the present embodiment. The image forming apparatus 100 is comprised of an image controller unit 101, an operation unit 110, a scanner unit 112, a printing unit 114. A CPU 102 controls copying and printing from a host computer by controlling each device comprehensively. Various parameters or programs required for execution of the image forming apparatus are stored on a ROM 104. A RAM 103 functions as a main memory and a work area of the CPU 102, and is used as a buffer region for image data for scanning, printing, or the like. An HDD 105 is accessed by each module as a temporary storage of print data received from a network 108 via a network I/F 107, and as a swap region of a raster image processor (RIP) 106 and an image processing unit 115. The RIP 106 expands a page description language (PDL) into raster image data. An operation unit I/F 109 is a communication I/F for controlling a key input from the connected operation unit 110 and display output to the operation unit 110. The operation unit 110 is comprised of hard keys and a touch panel, and is able to perform status display and operations of the image forming apparatus 100. A scanner I/F 111 is a communication I/F for controlling the connected scanner unit 112, and performs transmission and reception of control commands of the scanner unit 112 and receiving of images scanned optically by the scanner unit 112. The scanner unit 112 scans an original document optically. A printing unit I/F 113 is a communication I/F for controlling the connected printing unit 114, and performs transmission and reception of control commands for the printing unit 114 and transmitting of images printed by the printing unit 114. An image processing unit 115 performs image processing, such as resize, rotation, color conversion and smoothing, on images scanned in the scanner unit 112 and images that the RIP 106 generates.

<Example of Charge Classification>

Figure 2:
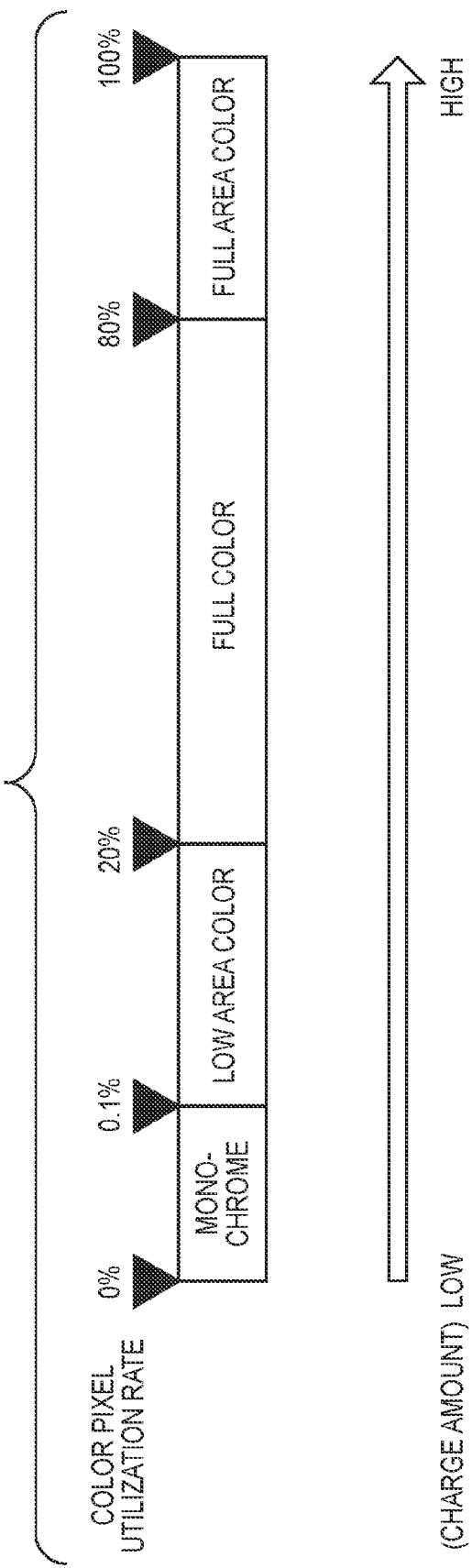
FIG. 2 is a view for showing an example of a charge classification for each color pixel utilization rate upon color printing according to the first embodiment.

FIG. 2 is an example of charge classifications for each color pixel utilization rate in color printing according to the present embodiment. According to a calculated color pixel utilization rate, the following four stages of charge classification are provided. In a case where the color pixel utilization rate is less than 0.1%, monochrome charging is performed, in a case where the color pixel utilization rate is greater than or equal to 0.1% and less than 20%, low area color charging is performed, in a case where the color pixel utilization rate is greater than or equal to 20% and less than 80%, full color charging is performed, and in a case where the color pixel utilization rate is greater than or equal to 80%, full area color charging is performed. For the charge amount, monochrome charging is set to be lowest, and the charge amount becomes higher in order from low area color, to full color, to full area color. Of course this classification is only one example, and three stages or more than five stages of charge classifications may be provided.

Note, it is assumed that for example, a color pixel is a pixel which includes (for example a value is larger than 0) any color component excluding K, in a case where a device color, which is a color component used for image forming onto a sheet, is constituted by four colors: cyan (C), magenta (M), yellow (Y), and black (K). Of course another definition may be provided, and, for example, the same definition as in patent document 1 may be provided. In the present example, counting the color pixel is performed after converting or while converting image data to raster image data that is displayed in a color system of the device color. And the color pixel utilization rate is a ratio at which the color pixels occupy with respect to the number of pixels per page. A pixel density of the image forming apparatus is normally fixed, so the number of pixels recorded in the pixel density is determined by a sheet size of a sheet to be printed. Therefore the color pixel utilization rate can be a ratio of a surface area for which color pixels are recorded (a color surface area) with respect to a surface area of a sheet. Therefore, the color pixel utilization rate can be referred to as a color surface area rate.

In this embodiment, boundary values of classifications are set to 0.1%, 20% and 80%, but limitation is not made to these values, and other values may be used. Also, the number of classifications is not limited to the four stages of monochrome, low area color, full color and full area color, and new classifications can also be provided, of classifications may be reduced.

<Example of Charge Table>

Figures 3, 4:
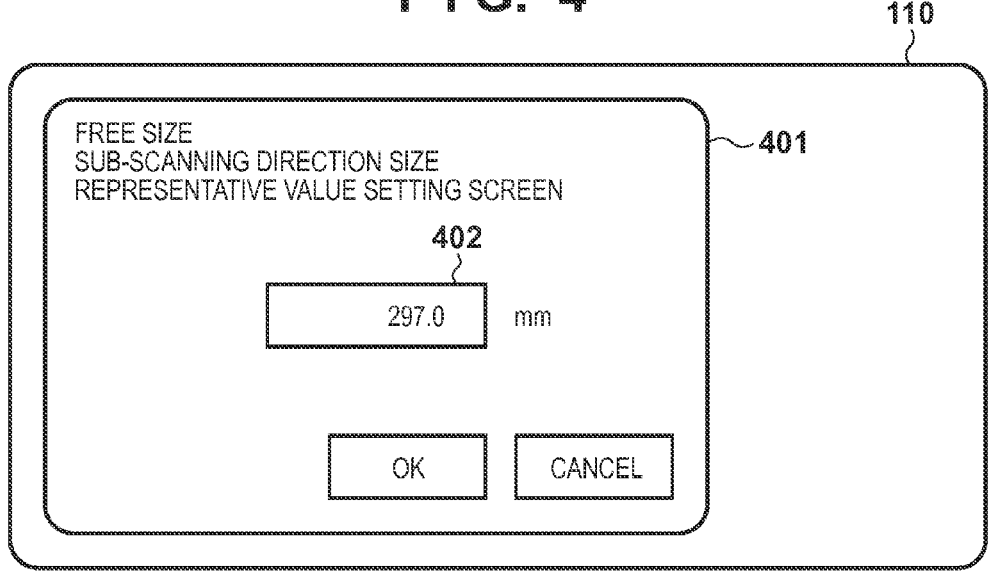
FIG. 3 is a view for showing an example of a charge table according to the first embodiment.
FIG. 4 is a view for showing an example of a sub-scanning length setting screen for free size printing according to the first embodiment.

FIG. 3 is a view for showing an example of a charge table according to the present embodiment. The color pixel utilization rate is classified into the four stages of monochrome, low area color, full color and full area color. Not only the color pixel utilization rate, but also the sheet size is categorized into two stages. In the present example, the sheet size is classified into two stages of a large size or a small size, the number of corresponding sheets to be printed is counted in units of the eight combinations that combine the sheet sizes and the color pixel utilization rates, and the charge amount is calculated in the manner of accumulating the unit prices for each classification. In other words, a money amount corresponding to a determined charge classification is obtained for each sheet, and the total amount to charge is calculated by accumulating the obtained money amounts.

In this embodiment, examples of sheets of the small size are A4, LTR, B5 and B4, and examples of sheets of the large size are A3 and 11×17 inch. However, the classification of sizes is not limited to this, and for example, sheets of the small size may be smaller than the A4 size, and other classifications can be defined. Which sheet size is actually counted in which size classification is not limited.

<Configuration of Free Size>

FIG. 4 is an example of a sub-scanning direction length representative value setting screen for free size printing according to the present embodiment, i.e. for printing using a sheet of an unknown sheet size. It is possible to set a representative value of the sub-scanning direction length in a text box 402 displayed on a touch panel 401 in the operation unit 110. In this embodiment, the calculation of the color pixel utilization rate upon free size printing is performed using the total number of pixels in an image region obtained from the sub-scanning direction length representative value set to the text box 402 for denominator, and using the number of color pixels of these pixels for a numerator. Note, for the sheet length in the main scanning direction, a representative value may be inputted by a user similarly to the sub-scanning direction length representative value, and, for example, the length of the main scanning direction can be determined by detecting a position of a guide of a feeding apparatus of the sheet by sensors, if the image forming apparatus is provided with such elements.

Regarding the representative value set to the text box 402, it is advantageous to set the sub-scanning direction length to be that of a sheet which has a highest usage frequency for the user. With this, the calculation of a more appropriate color pixel utilization rate can be performed to matching the actual usage of the user. The representative value set is stored, and referenced when printing to a free size sheet.

Figure 5:
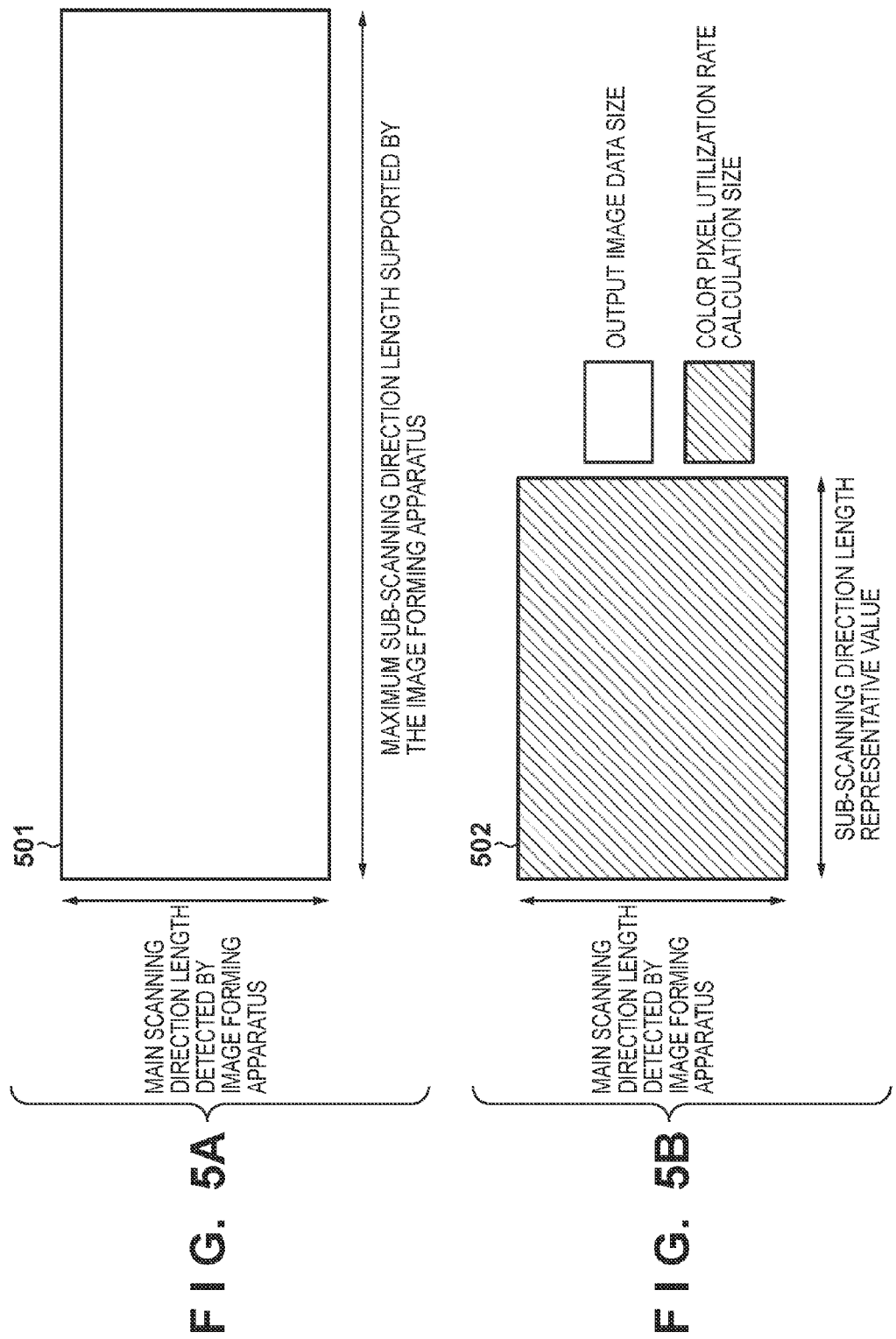
FIG. 5A and FIG. 5B are comparison views of an output image data size and a color pixel utilization rate calculation size for free size printing according to the first embodiment.

FIG. 5A and FIG. 5B are a comparison views of an output image data size and a color pixel utilization rate calculation size in free size printing according to the present embodiment. In a case of free size printing, the main scanning direction length of a sheet set to a sheet feeding unit can be detected by the image controller unit 101 of the image forming apparatus 100, but the sub-scanning direction length cannot be detected. For this reason, the image controller unit 101 determines an output image data size 501 on a basis of a maximum sub-scanning direction length supported by the image forming apparatus. The image controller unit 101 generates output image data of a size of the output image data size 501, and transfers the output image data to the printing unit 114. The printing unit 114 generates a toner image transferred on a paper based on received output image data, but what is transferred onto the paper is only a portion for the sub-scanning direction length of the actual paper. In other words, a region not actually printed on a paper is included in the output image data size 501. For this reason, a calculation result may be inaccurate if the calculation of the color pixel utilization rate using the output image data size 501 is performed.

In this embodiment, an approach in which the color pixel utilization rate calculation size 502 is calculated separately to the output image data size 501, and a calculation of the color pixel utilization rate is performed using these, is presented in order to avoid this problem. Because the image forming apparatus 100 is capable of detecting the main scanning direction length, the color pixel utilization rate calculation size 502 is determined by changing only the sub-scanning direction length.

In this embodiment, an example of calculating the color pixel utilization rate calculation size 502 based on the sub-scanning direction length representative value, set in the text box 402 in the sub-scanning direction length representative value setting screen shown in FIG. 4, is shown, but calculation may be performed by another approach.

<Charge Classification Determination Processing>

Figure 6:
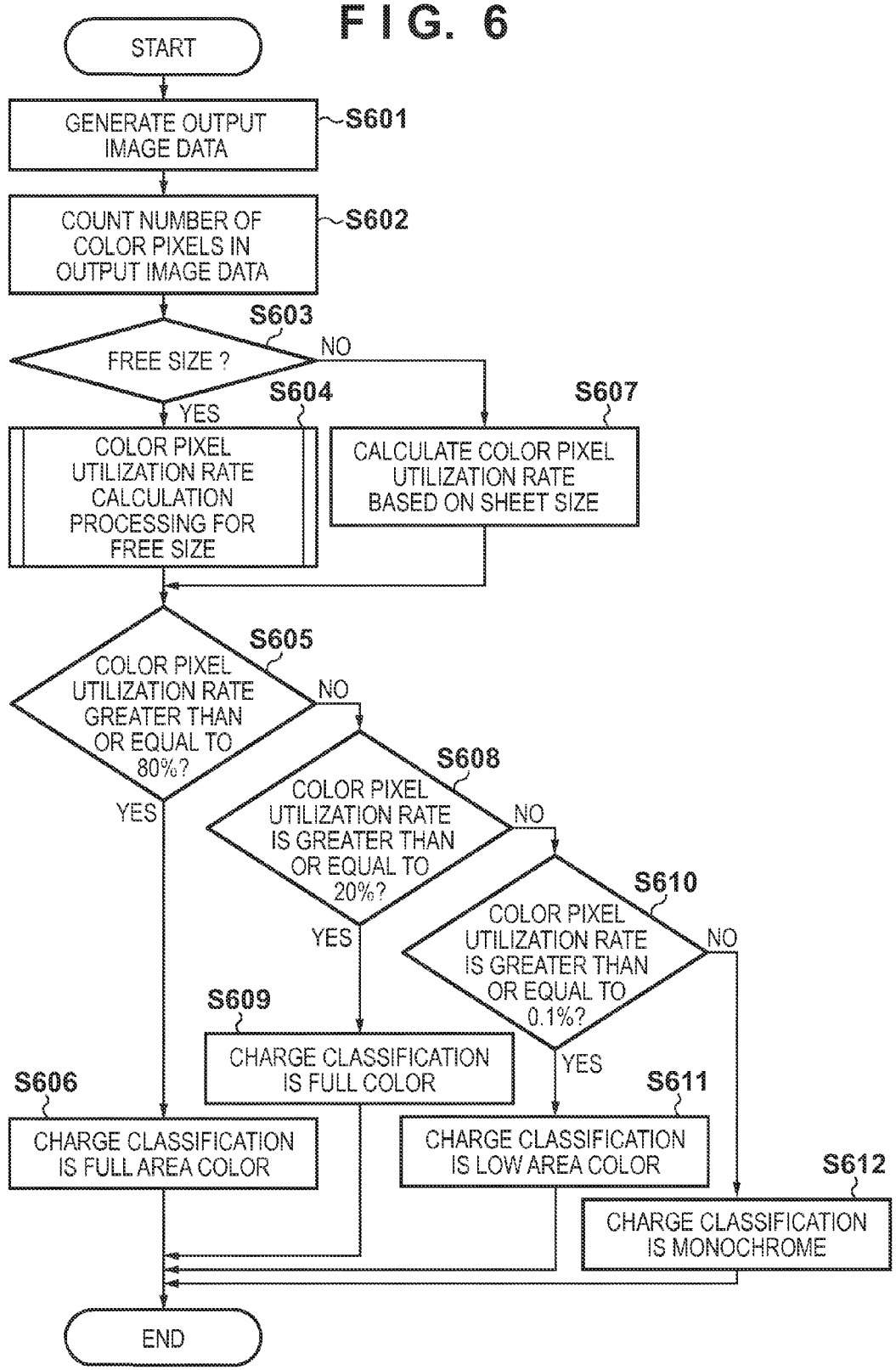
FIG. 6 is a charge division determination processing flowchart according to the first embodiment.

FIG. 6 is a charge classification determination processing flowchart according to the present embodiment. Note, step S601-step S611 in the figure indicate each step.

The image controller unit 101 performs the processing of step S601 where the image controller unit 101 generates output image data, i.e. image data to be printed from the image scanned by the scanner unit 112. Here, output image data is generated not on the basis of the sheet size, but on the basis of the size of the maximum output image data size 501 in a case of free size printing. Next, the image controller unit 101 performs the processing of step S602 in which the image controller unit 101 counts the number of color pixels in the image data generated in step S601. Next, the image controller unit 101 performs the processing of step S603 where the image controller unit 101 determines whether the sheet to be printed is free size or not. In a case of free size (YES), the image controller unit 101 performs the processing of step S604 in which the image controller unit 101 performs the color pixel utilization rate calculation for the free size. In this case, because the output image data size and the sheet size do not match in step S604, the calculation result of the color pixel utilization rate is obtained by performing an adjustment of the sub-scanning direction length. Note, for the reason that the processing details of step S604 vary for each embodiment, detailed explanation will be given later. On the other hand, in a case of the sheet not being free size (NO) in step S603, after the image controller unit 101 performs the processing of step S607 where the image controller unit 101 calculates the color pixel utilization rate using the total number of pixels in output image data functioning as a denominator, and the image controller unit 101 performs the processing of step S605. In this case, the output image data size and the sheet size are matching in step S607, so the calculation of the color pixel utilization rate can be performed correctly using the number of pixels corresponding to the sheet size functioning as a denominator without performing particular adjustment of the sub-scanning direction length.

If the color pixel utilization rate is calculated, next, the image controller unit 101 performs the processing of step S605 in which the image controller unit 101 determines whether the color pixel utilization rate is greater than or equal to a threshold of the first classification (80% in the present example). In a case where the color pixel utilization rate is greater than or equal to 80% (YES), the image forming apparatus 100 performs the processing of step S606 where the image forming apparatus 100 determines the type of charging to be the first classification, i.e. full area color, and then the charge classification determination processing completes.

On the other hand, in a case where the color pixel utilization rate is less than the threshold of the first classification, i.e. 80%, in step S605, the image controller unit 101 performs the processing of step S608 in which the image controller unit 101 determines whether the color pixel utilization rate is greater than or equal to the threshold of the second classification (20% in the present example). In a case where the color pixel utilization rate is greater than or equal to 20% (YES), the image controller unit 101 performs the processing of step S609 in which the image controller unit 101 determines the type of charging to be the second classification, i.e. full color, and the charge classification determination processing completes.

On the other hand, in a case where the color pixel utilization rate is less than the threshold of the second classification, i.e. 20%, in step S608, the image controller unit 101 performs the processing of step S610 where the image controller unit 101 determines whether the color pixel utilization rate is greater than or equal to the threshold of the third classification (0.1% in the present example). In a case where the color pixel utilization rate is greater than or equal to 0.1% (YES), the image controller unit 101 performs the processing of step S611 in which the image controller unit 101 determines the type of charging to be the third classification, i.e. low area color, and the charge classification determination processing completes.

On the other hand, in a case where the color pixel utilization rate is less than the threshold of the third classification, i.e. 0.1% in step S610, the image controller unit 101 performs the processing of step S612 where the image controller unit 101 determines the type of charging to be the fourth classification in other words monochrome, and the charge classification determination processing is completed.

Note, explanation was given for a case of copy printing in this embodiment, but this may be used for printing corresponding to print data received via the network I/F 107.

Figure 7:
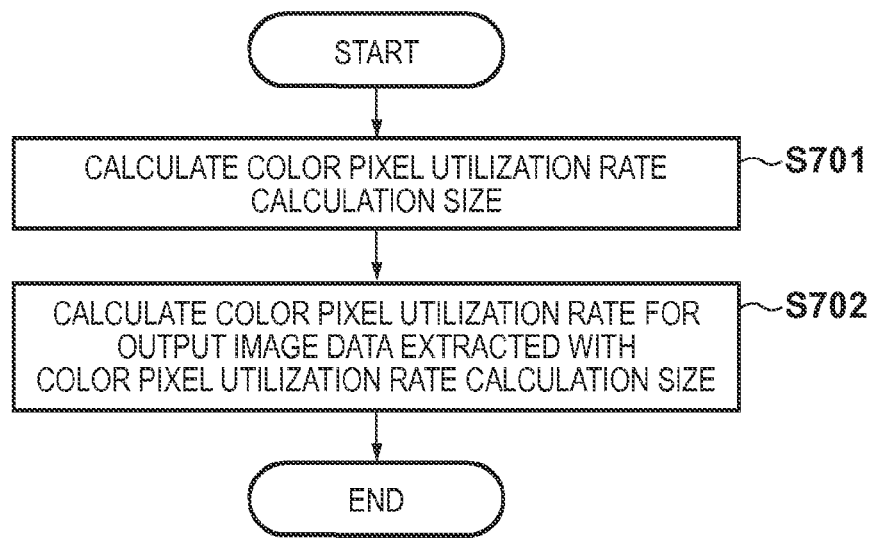
FIG. 7 is a color pixel utilization rate calculation processing flowchart for free size printing according to the first embodiment.

FIG. 7 is a color pixel utilization rate calculation processing flowchart for free size printing according to the present embodiment. This describes in detail the processing of step S604 extracted from the flowchart in FIG. 6. Note, step S701-step S702 in the figure indicate each step.

The image controller unit 101 performs the processing of step S701 in which the image controller unit 101 calculates an image-forming area used for the color pixel utilization rate calculation. The sub-scanning direction length representative value is set by a user and is a stored value. Also, because the image forming apparatus side is capable of detecting the main scanning direction length, the color pixel utilization rate calculation size 502 can be determined from the main- and the sub-scanning direction lengths. The determined size can be converted to a number of pixels by multiplying the size by the pixel density of the formed image. Pixel densities are often indicated unidimentionally for each of the main and sub-scanning directions, so the pixel density of a unit area is obtained by multiplying these, and then the pixel density of the unit area can be converted into the total number of pixels by multiplying by the size, i.e. the surface area. Next, the image controller unit 101 performs the processing of step S702 in which the image controller unit 101 performs calculation of the color pixel utilization rate using the total number of pixels in the region extracted from the output image data leading edge for only the part of the color pixel utilization rate calculation size 502 for a denominator, and the color pixel utilization rate calculation processing completes. Note, in a case where the sub-scanning direction size representative value is not set or the value is 0, the length of the maximum sub-scanning direction which allows image formation may be used.

According to the above configuration, it becomes possible to perform calculating the color pixel utilization rate accurately even for free size printing for which the size cannot to be determined, by cutting out the image of the calculation target using a sub-scanning direction size representative value set to match the actual usage of the user, without using the output image data as is.

Second Embodiment

In the first embodiment, one free size sub-scanning direction length representative value can be set. However, depending on a configuration of the image forming apparatus 100, the sub-scanning direction length of a sheet may be detectable in two stages, a large size and a small size. In a second embodiment, an approach of automatically switching a color pixel utilization rate calculation approach in a case of such a configuration is described.

Figure 8:
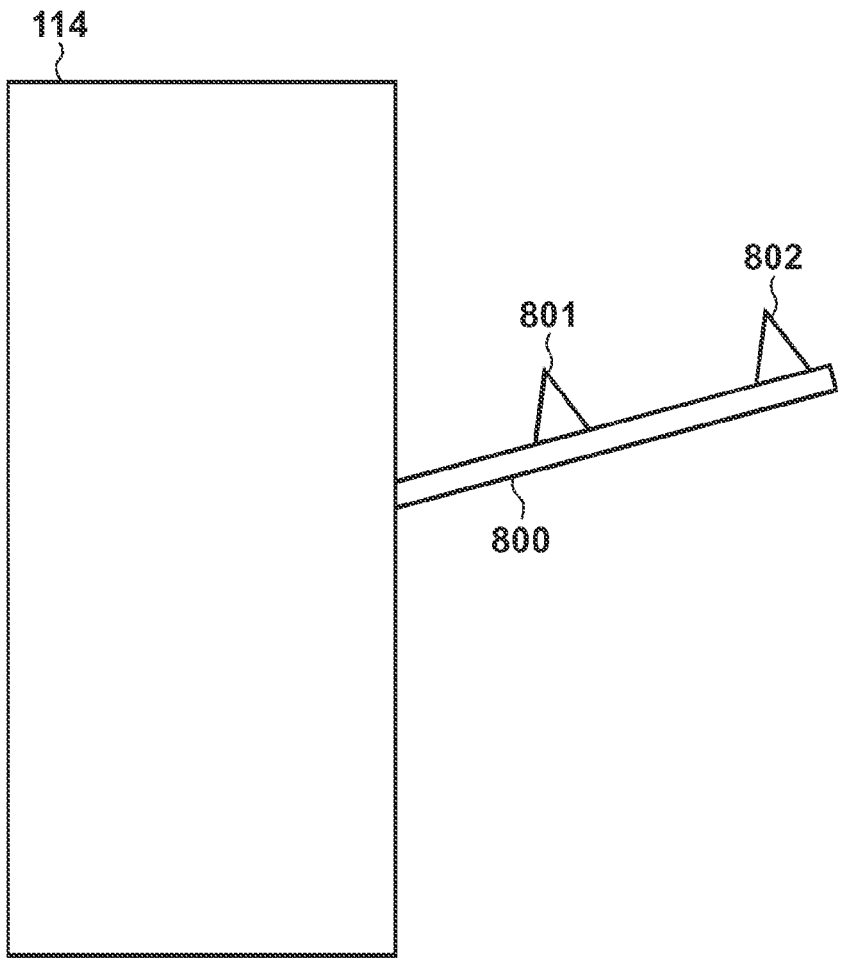
FIG. 8 is a cross-section view of a manual paper feeding unit in a printing unit according to a second embodiment.

FIG. 8 is a cross-section view of the printing unit 114 comprising a sub-scanning direction paper length sensor (a detection unit) for determining the length of one side of a sheet and a manual paper feeding unit 800 which is part of the printing unit 114 in the present embodiment. The manual paper feeding unit 800 is further comprised of a first stage detection sensor 801 and a second stage detection sensor 802. With the two detection sensors, it becomes possible to detect whether the size of the sheet placed on the manual paper feeding unit 800 is the large size or the small size. When a sheet is placed on the manual paper feeding unit 800, it can be determined that a small size sheet is placed, if only the first stage detection sensor 801 in detects the sheet. Also, it can be determined that a large size sheet is placed, if both the first stage detection sensor 801 and the second stage detection sensor 802 detect a sheet.

FIG. 9 is an example of the sub-scanning direction size representative value setting screen in free size printing according to the present embodiment. Unlike the first embodiment, two text boxes (a text box 901 and a text box 902) exist on the touch panel 401 of the operation unit 110. A representative value of the sub-scanning direction size of the large size can be set for the text box 901, and a representative value of the sub-scanning direction size of the small size can be set for the text box 902. With this, when free size printing is performed, it becomes possible to switch the representative value of the sub-scanning direction size for calculating the color pixel utilization rate based on a detection result of the manual paper feeding unit 800, and calculate the color pixel utilization rate using the appropriate value.

FIG. 10 is a color pixel utilization rate calculation processing flowchart for free size printing according to the present embodiment. The processing of step S604 in the flowchart in FIG. 6 is replaced for the second embodiment. Note, step S1001-step S1004 in the figure indicate each step.

The image controller unit 101 performs the processing of step S1001 which determines whether the sheet size is the large size or not using the first stage detection sensor 801 and the second stage detection sensor 802 of the manual paper feeding unit 800. If the sheet size is determined to be the large size (YES), the image forming apparatus 100 calculates the color pixel utilization rate using the total number of pixels obtained from the sub-scanning direction length representative value for the large size for the denominator, and the color pixel utilization rate calculation processing completes.

On the other hand, in step S1001, if the sheet size is determined not to be the large size (NO), the image controller unit 101 calculates the color pixel utilization rate using the total number of pixels obtained from the sub-scanning direction length representative value for the small size for the denominator, and the color pixel utilization rate calculation processing is completed.

According to the above procedure, even in a case where free size is designated, a more appropriate charge classification can be applied. Note, if the positions of the sensors 801 and 802 are fixed, it is possible to identify the large size and the small size detected by the sensors in a certain range because the usable size is limited. In such a case, maximum sheet sizes in the ranges of each size can be used as the specific sizes of the large size and the small size. In this way, an appropriate charge can be made upon free size printing without setting each size.

Third Embodiment

In the first embodiment and the second embodiment, the calculation result of the color pixel utilization rate is optimized by setting a representative value of the sub-scanning direction length beforehand. In the third embodiment, an approach of obtaining the sub-scanning direction length dynamically in free size printing using a size of the output image obtained from a size and a magnification factor of an original document image of a copy original is described.

FIG. 11 is a color pixel utilization rate calculation processing flowchart for free size printing according to the present embodiment. The processing of step S604 in the flowchart in FIG. 6 is replaced for the third embodiment. Note, step S1101-step S1102 in the figure indicate each step.

The image controller unit 101 performs the processing of step S1101 for obtaining the color pixel utilization rate calculation size 502 based on the size of an original scanned in the scanner unit 112 and the magnification factor corresponding to the image. For example, if the sub-scanning direction length of an original scanned in the scanner unit 112 is 210.0 mm, and the magnification factor is 120%, then the sub-scanning direction length in the color pixel utilization rate calculation can be obtained by calculating 210.0×1.2=252.0 mm. Also, because the image forming apparatus side is capable of detecting the main scanning direction length, the color pixel utilization rate calculation size 502 can be determined from the main- and the sub-scanning direction lengths. Next, the image controller unit 101 performs the processing of step S1102 in which the image controller unit 101 performs calculation of the color pixel utilization rate using the total number of pixels in the region extracted from the output image data leading edge for only the part of the color pixel utilization rate calculation size 502 for a denominator, and the color pixel utilization rate calculation processing completes. It becomes possible to perform the calculation of the color pixel utilization rate accurately, by cutting out an image of a calculation target whose size is calculated based on the document size and the magnification factor rather than using output image data as is.

Note, explanation was given for a case of copy printing in this embodiment, but this may be used for printing corresponding to print data received via the network I/F 107.

Fourth Embodiment

In the first embodiment and the second embodiment, the calculation result of the color pixel utilization rate is optimized by setting a representative value of the sub-scanning direction length beforehand. However, the calculation result with the sub-scanning direction length representative value is not necessarily correct. For example, if the printing is performed having setting a sheet whose sub-scanning direction length is significantly different from the sub-scanning direction length representative value, the calculation result of the color pixel utilization rate will be inaccurate. In the fourth embodiment, an approach of configuring, so that a calculation of inaccurate the color pixel utilization rate is not performed due to prohibiting of free size printing, in a case where stepwise charges based on the color pixel utilization rate are made, is shown.

FIG. 12A and FIG. 12B are examples of sheet size setting screens according to the present embodiment. Various sheet size buttons including a free size button 1201 are arranged on the touch panel 401 of the operation unit 110. In a case where stepwise charges based on the color pixel utilization rate are not made, the free size button 1201 is activated as in FIG. 12A, and free size printing where the sub-scanning direction length is not specified is enabled. On the other hand, if stepwise charges based on the color pixel utilization rate are made, the free size button 1201 is inactivated as in FIG. 12B, and free size printing is prohibited. With this, the calculation result of the color pixel utilization rate is prevented from becoming inaccurate. A setting of the charging approach of whether or not to make stepwise charges based on the color pixel utilization rate is normally determined by a contract between a vendor and a user of an image forming apparatus, so this setting is set by the vendor in advance. When displaying the sheet size selection screens in FIG. 12 and FIG. 12B, a setting of the charging approach is referenced, and the screen in FIG. 12 is displayed in accordance with the setting. Note, if there is designation that the setting of the apparatus is prioritized, the sheet size selected in the sheet size selection screen in FIG. 12 or FIG. 12B is applied to the printing not only in a copy operation, but also when the image forming apparatus is used as a printer.

Fifth Embodiment

In the first embodiment, charges are made in two stages where the classification of the sheet size is the large size or the small size. For example, the actual sheet size of B5 and that of B4 are different, but charges are made as the small size for both of these in this embodiment. In this kind of case, a problem arises in that the charge amount becomes distorted by the difference with the denominator in the color pixel utilization rate calculation. In the fifth embodiment, an explanation of the details and the solution of this problem is made. Note that in this embodiment, the explanation is performed on the premise that a B4 size is an upper limit value of the small size and a sheet larger than the B4 size is charged as the large size.

FIG. 13A, FIG. 13B and FIG. 13C are showing the problem to be solved in the present embodiment and the solution graphically. FIG. 13A is a view in which a color image of all one color is printed on the whole sheet of the B5 size. In this case, the color pixel utilization rate becomes 100%, and charging is made as the small size and full area color. On the other hand, FIG. 13B is view in which a color image which has the same surface area as the color image in FIG. 13A is printed on the left half of the sheet of the B4 size. In this case, the color pixel utilization rate becomes 50%, and a charge is performed as the small size and full color. Irrespective of the same surface area of the color image, i.e. the same toner consumption amount, being used, a distorted situation in which the printing on the B5 size, which is the smaller sheet size, is charged at a higher rate than the printing on the B4 size, which is the larger sheet size, occurs.

FIG. 13C shows a solution to the above problem. The number of pixels recorded as the maximum size of each classification of the sheet size (in other words the surface area corresponding to the maximum size) is used for the total number of pixels functioning as the denominator in the color pixel utilization rate calculation. For example if the sheet size is the small size (less than or equal to the B4 size) the number of pixels recorded on the B4 size, which is the maximum size of the small size, is used for the denominator of the color pixel utilization rate regardless of the actual size. With this, it becomes possible to obtain the same color pixel utilization rate for image data for which the same toner consumption amount is used.

Figure 14:
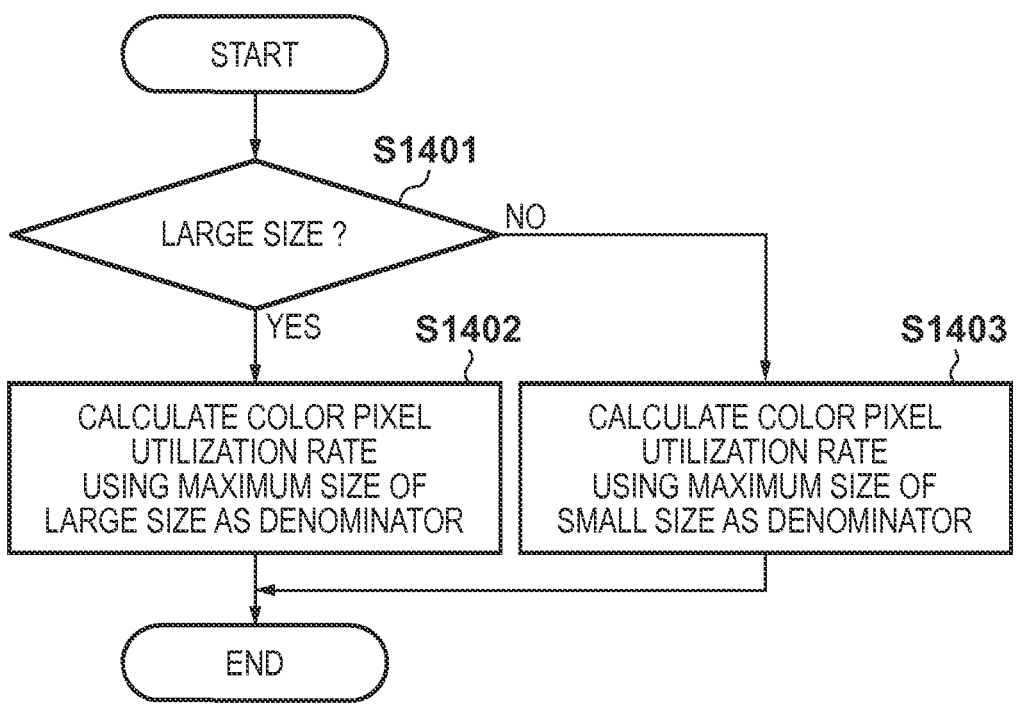
FIG. 14 is a color pixel utilization rate calculation processing flowchart according to the fifth embodiment.

FIG. 14 is a color pixel utilization rate calculation processing flowchart according to the present embodiment. The processing of step S607 in the flowchart in FIG. 6 is replaced by the procedure in FIG. 14 in the processing of the present embodiment. Note, step S1401-step S1403 in the figure indicate each step. Other steps are the same as steps in FIG. 6, so their explanation will be omitted.

The image controller unit 101 performs the processing of step S1401 in which the image controller unit 101 determines whether a sheet to be printed is the large size or not. In a case where a sheet to be printed is the large size (YES), the image controller unit 101 calculates the color pixel utilization rate using the total number of pixels obtained from the maximum size of the large size as the denominator, and the color pixel utilization rate calculation processing completes.

On the other hand in step S1401, in a case where a sheet to be printed is not the large size (NO), the image controller unit 101 calculates the color pixel utilization rate using the total number of pixels, obtained from the maximum size of the small size, as the denominator, and the color pixel utilization rate calculation processing completes.

Note, in this embodiment, a color area utilization rate is calculated fixedly using a predetermined size, for example the large size, as a classification of the sheet size in step S604, in performing free size printing. Alternatively, if a sensor which can detect the size in two stages is provided, the procedure in FIG. 10 may be used for step S604.

According to the above configuration, an illogical charge classification ascribable to a difference between the sheet sizes can be corrected, and an appropriate charge classification can be decided.

Note, in the above described embodiment, the charge classification is determined based on the classification of the color pixel utilization rate and the category of the sheet size, but the number of color pixels, i.e. the surface area covered by the color pixels itself (the color surface area), may be used in place of the color pixel utilization rate.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-183406, filed Sep. 4, 2013, which is hereby incorporated by reference herein in its entirety.

What is claimed is:

1. An image forming apparatus comprising:
   a determination unit configured to determine whether an output sheet size is in a first category or in a second category having a size larger than that of the first category;
   a unit configured to obtain a color surface area in a printing target page; and
   a deciding unit configured to decide a charge classification of the page from among a monochrome charge classification and a plurality of color charge classification based on the determined category and the obtained color surface area, wherein
   the determining unit, in a case where the output sheet size is unknown, is configured to determine that the output sheet size is in the second category.

2. The image forming apparatus according to claim 1, wherein the deciding unit includes a unit configured to obtain a color surface area rate by, in a case where the output sheet size is in the first category, dividing a color surface area by a surface area corresponding to the first category, and in a case where the output sheet size is in the second category, dividing a color surface area by a surface area corresponding to the second category, and the deciding unit is configured to decide the classification of the page in accordance with a combination of the determined category and the color surface area rate.

3. The image forming apparatus according to claim 2, wherein the unit configured to obtain the color surface area rate is configured to obtain the color surface area rate using maximum surface areas of sheet sizes classified under each of the first and second categories as the surface areas corresponding to the first and the second categories respectively.

4. The image forming apparatus according to claim 2, wherein the unit configured to obtain the color surface area rate is configured to obtain the color surface area rate using surface areas corresponding to sheet sizes as the surface areas corresponding to the first and second categories respectively, and in a case where the output sheet size is unknown, obtain the color surface area rate using a preset sheet size as the sheet size.

5. The image forming apparatus according to claim 2, further comprising a unit configured to determine whether a length of one side of a sheet for which a sheet size is unknown is a first size or a second size, wherein
   the determining unit is configured, in the case where the output sheet size is unknown, to determine that the sheet size is in the first category if the length of the one side of the sheet is a first length, and to determine that the output sheet size is in the second category if the length of the one side of the sheet is a second length, wherein
   the unit configured to obtain the color surface area rate is configured, in a case where the sheet size is known, to obtain the color surface area rate using the surface area corresponding to the output sheet size, and in a case where the output sheet size is unknown, to obtain the color surface area rate using preset representative values of sheet sizes classified into the first and second categories respectively as the surface areas corresponding to the first and second categories respectively.

6. The image forming apparatus according to claim 2, wherein the unit configured to obtain the color surface area rate is configured, in a case where the output sheet size is known, to obtain the color surface area rate using the surface area corresponding to the output sheet size, and in a case where the output sheet size is unknown, to obtain the color surface area rate using a size, obtained by multiplying a size of an original image formed on the sheet by a magnification factor corresponding to the original document image, as the unknown sheet size.

7. The image forming apparatus according to claim 1, wherein a paper for which a sheet size is unknown cannot be designated as a sheet to be output.

8. The image forming apparatus according to claim 1, wherein the deciding unit is configured to decide the classification of the page in accordance with a combination of the category that the determination unit determines and the color surface area.

9. The image forming apparatus according to claim 1, further comprising a unit configured to decide a charge classification in accordance with a category of the output sheet size and the classification.

10. A page classification method by an image forming apparatus, the method comprising:
    a determination step of determining whether an output sheet size is in a first category or in a second category having a size larger than that of the first category;
    a step of obtaining a color surface area in a printing target page; and
    a decision step of deciding a charge classification of the page from among a monochrome charge classification and a plurality of color charge classification based on the determined category and the obtained color surface area, wherein
    in the determining step, in a case where the output sheet size is unknown, it is determined that the sheet size is in the second category.

11. A non-transitory computer readable storage medium storing a program for causing a page classification method to be executed by a computer, the method comprising:
    a determination step of determining whether an output sheet size is in a first category or in a second category having a size larger than that of the first category;
    a step of obtaining a color surface area in a printing target page; and
    a decision step of deciding a charge classification of the page from among a monochrome charge classification and a plurality of color charge classification based on the determined category and the obtained color surface area, wherein
    in the determining step, in a case where the output sheet size is unknown, it is determined that the sheet size is in the second category.

* * * * *